(12) United States Patent
Fogelstrom

(10) Patent No.: US 7,348,878 B2
(45) Date of Patent: Mar. 25, 2008

(54) TIRE PRESSURE MONITORING SYSTEM WITH PERMANENT TIRE IDENTIFICATION

(75) Inventor: Kenneth A. Fogelstrom, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 211 days.

(21) Appl. No.: 11/238,220

(22) Filed: Sep. 29, 2005

(65) Prior Publication Data
US 2007/0069877 A1    Mar. 29, 2007

(51) Int. Cl.
B60C 23/00    (2006.01)
(52) U.S. Cl. .................... 340/442; 340/438; 73/146; 73/146.2
(58) Field of Classification Search ............... 340/442, 340/438; 73/146, 146.2
See application file for complete search history.

(56) References Cited

U.S. PATENT DOCUMENTS

| | | | |
|---|---|---|---|
| 4,978,941 A * | 12/1990 | Brown ..................... 340/447 |
| 5,473,938 A * | 12/1995 | Handfield et al. ......... 73/146.5 |
| 5,537,090 A * | 7/1996 | Thomas et al. ............ 340/443 |
| 5,731,754 A * | 3/1998 | Lee et al. ................. 340/447 |
| 6,278,363 B1 * | 8/2001 | Bezek et al. .............. 340/442 |
| 6,281,787 B1 * | 8/2001 | Lerg et al. ................ 340/442 |
| 6,362,731 B1 * | 3/2002 | Lill ......................... 340/445 |
| 6,463,798 B2 * | 10/2002 | Niekerk et al. ........... 73/146.2 |
| 6,535,116 B1 * | 3/2003 | Zhou ........................ 340/447 |
| 6,545,599 B2 * | 4/2003 | Derbyshire et al. ....... 340/442 |
| 6,581,449 B1 * | 6/2003 | Brown et al. .............. 73/146 |
| 6,630,885 B2 * | 10/2003 | Hardman et al. ......... 340/505 |
| 6,684,691 B1 * | 2/2004 | Rosseau ................... 73/146 |
| 6,687,609 B2 * | 2/2004 | Hsiao et al. .............. 701/207 |
| 6,724,301 B2 | 4/2004 | Ginman et al. |
| 7,002,455 B2 * | 2/2006 | Buck et al. ............... 340/442 |
| 7,073,377 B2 * | 7/2006 | Lin ......................... 73/146.8 |
| 7,116,217 B2 * | 10/2006 | Okubo ...................... 340/445 |
| 2002/0021208 A1 * | 2/2002 | Nicholson et al. ........ 340/10.34 |
| 2002/0039066 A1 * | 4/2002 | Fuller et al. .............. 340/442 |
| 2002/0084896 A1 * | 7/2002 | Dixit et al. ............... 340/447 |
| 2003/0006895 A1 * | 1/2003 | Drake et al. .............. 340/445 |
| 2003/0048178 A1 * | 3/2003 | Bonardi et al. ........... 340/442 |
| 2003/0058118 A1 * | 3/2003 | Wilson ..................... 340/679 |
| 2003/0080862 A1 * | 5/2003 | Kranz ...................... 340/442 |
| 2003/0156021 A1 * | 8/2003 | Tabata et al. ............. 340/442 |
| 2003/0201879 A1 * | 10/2003 | Munch et al. ............. 340/442 |
| 2003/0227379 A1 * | 12/2003 | Itou ......................... 340/442 |
| 2004/0017291 A1 * | 1/2004 | Hardman et al. ......... 340/505 |
| 2004/0130442 A1 * | 7/2004 | Breed et al. .............. 340/443 |

(Continued)

Primary Examiner—Davetta W. Goins
Assistant Examiner—Kerri McNally
(74) Attorney, Agent, or Firm—Jeffrey P. Calfa; Gerald W. Askew

(57) ABSTRACT

A tire pressure management system for a tractor/trailer system uses exterior sidewall mounted tire RFID tags, valve mounted tire pressure sensors and transmitters, radio repeaters, a tire pressure management system receiver with controller area network interface, a body computer for execution of software modules of the system and a controller area network for carrying data between the body computer and tire pressure management system receiver. The system provides varying functionality depending upon which elements are present. To deal with absence of a tractor, variation in the complimentary TPMS components installed on the tractor, or lack of any complimentary TPMS components installed on the tractor a trailer mounted repeater includes sufficient local processing power and display capability to alert users of any tire pressure problem on the trailer.

15 Claims, 4 Drawing Sheets

U.S. PATENT DOCUMENTS

| | | |
|---|---|---|
| 2004/0155764 A1* | 8/2004 | Ichinose .................... 340/447 |
| 2004/0164140 A1* | 8/2004 | Voeller et al. .............. 235/375 |
| 2004/0172179 A1* | 9/2004 | Miwa ........................ 701/29 |
| 2004/0178897 A1* | 9/2004 | Fennel et al. ............... 340/442 |
| 2005/0033485 A1* | 2/2005 | Nimmo et al. ................ 701/1 |
| 2005/0045257 A1* | 3/2005 | Kogure et al. ........... 152/152.1 |
| 2005/0264405 A1* | 12/2005 | Ueda ........................ 340/442 |
| 2005/0275517 A1* | 12/2005 | Tsukamoto et al. ......... 340/442 |
| 2007/0080795 A1* | 4/2007 | Ichikawa et al. ........... 340/447 |
| 2007/0113635 A1* | 5/2007 | Corniot ....................... 73/146 |

* cited by examiner

TIRE PRESSURE MONITORING SYSTEM WITH PERMANENT TIRE IDENTIFICATION

BACKGROUND OF THE INVENTION

1. Technical Field

The invention relates to tire pressure monitoring systems (TPMS) and more particularly to tire pressure monitoring systems which provide tire location identification and are integrated with tire service life management.

2. Description of the Problem

TPMS provide for monitoring of tire pressure for tires installed on a vehicle and for alerting a driver to variation in measured pressure from desired norms. Maintaining an individual tire at its recommended pressure helps extend tire life and promotes good vehicle fuel economy. Maintaining all of the tires on a vehicle at the recommended pressures promotes vehicle stability and driver control of the vehicle. Extension of TPMS to provide tire temperature data allows more accurate measurement of pressure.

Recent developments in radio frequency identification (RFID) have provided a particularly convenient way to identify and track specific tires. RFID tags applied to tires and the use of scanners to locate the tags allows maintaining databases of tire history indexed to specific tires and allows the quick location of a tire if such is needed. RFID tags may provide data storage capability and limited sensing functions, allowing the tags to be repository for data relating to a tire's service history and to be a source of data as to internal conditions.

TPMS have typically provided tire pressure sensors mounted on the wheel rim or positioned inside a tire installed on the wheel. Tire pressure sensors may also be mounted outside of the tire on the valve stem, in place of a valve cap. Radio frequency identification (RFID) systems have been proposed for read/write tire identification. However, when a rim mounted sensor incorporates the identification feature (ID) there has been no way to guarantee that data written thereon will follow the tire to a different rim if the tire is moved. Where an inner sidewall mounted pressure sensor is used, then ID remains with a tire, but new tires must come with compatible sensors or have them installed.

Many prior art TPMS have not allowed for both permanent tire radio frequency identification and tire pressure monitoring without the removal of tires for installation or replacement of associated hardware. In TPMS that requires removal of tires since pressure sensors are often mounted to the inner surface of the rim. Since the sensor does not necessarily stay mated to the tire, tire identification information is not provided with the sensor. Systems have been proposed that provide a combination device incorporating a pressure sensor and RFID. This combination device is mounted to the inner surface of the tire itself. A battery can be incorporated for power, allowing for direct transmission of data through the tire wall to a central system controller. In still other systems, a transponder would be mounted in the wheel well which would provide power to the combined sensor/RFID device by coupled radio waves. These solutions still suffer from the necessity of removal of the tires from rims in order to install or replace components of the system.

Some prior art TPMS have provided tire ID information located the sensor/RFID package inside the tire. This requires a hand held reader or antennas be located in, or be brought into, close proximity to the wheels in order for information to be retrieved or communicated. A more recent teaching is U.S. Pat. No. 6,724,301 to Ginman et al. Ginman proposed a dual tag tire and wheel RFID system. Ginman utilized a temporary tire tag located a tire and with RF read/write capability and another wheel mounted tag with RF read/write capability. Both tags were provided with the capability of storing data pertinent to tire and wheel condition. An external RFID interrogator is used to effect sharing of data between the two RFID tags. Data is not lost due to discard or rotation of tires.

SUMMARY OF THE INVENTION

According to the invention a fully featured tire pressure management system for a motor vehicle integrates sidewall mounted tire RFID tags, valve mounted pressure sensors and transmitters, strategically placed radio repeaters, a tire pressure management system receiver with controller area network interface, a body computer for execution of software modules of the system and a controller area network for carrying data between the body computer and tire pressure management system receiver. The system allows for partial operation in the absence of some selected components. For example, the system may be applied to a tractor/trailer vehicle with the trailer mounted components, and provide partial stand alone functionality for the trailer in case of absence of a tractor, variation in the complimentary TPMS components installed on the tractor and trailer, or lack of any complimentary TPMS components installed on the tractor. In one embodiment, a repeater is mounted on the trailer and includes sufficient local processing power and display capability to alert users of any tire pressure problem on the trailer even when no tractor is present. Additional variations in functionality depend upon whether the tire mounted RFID tags are passive or active.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
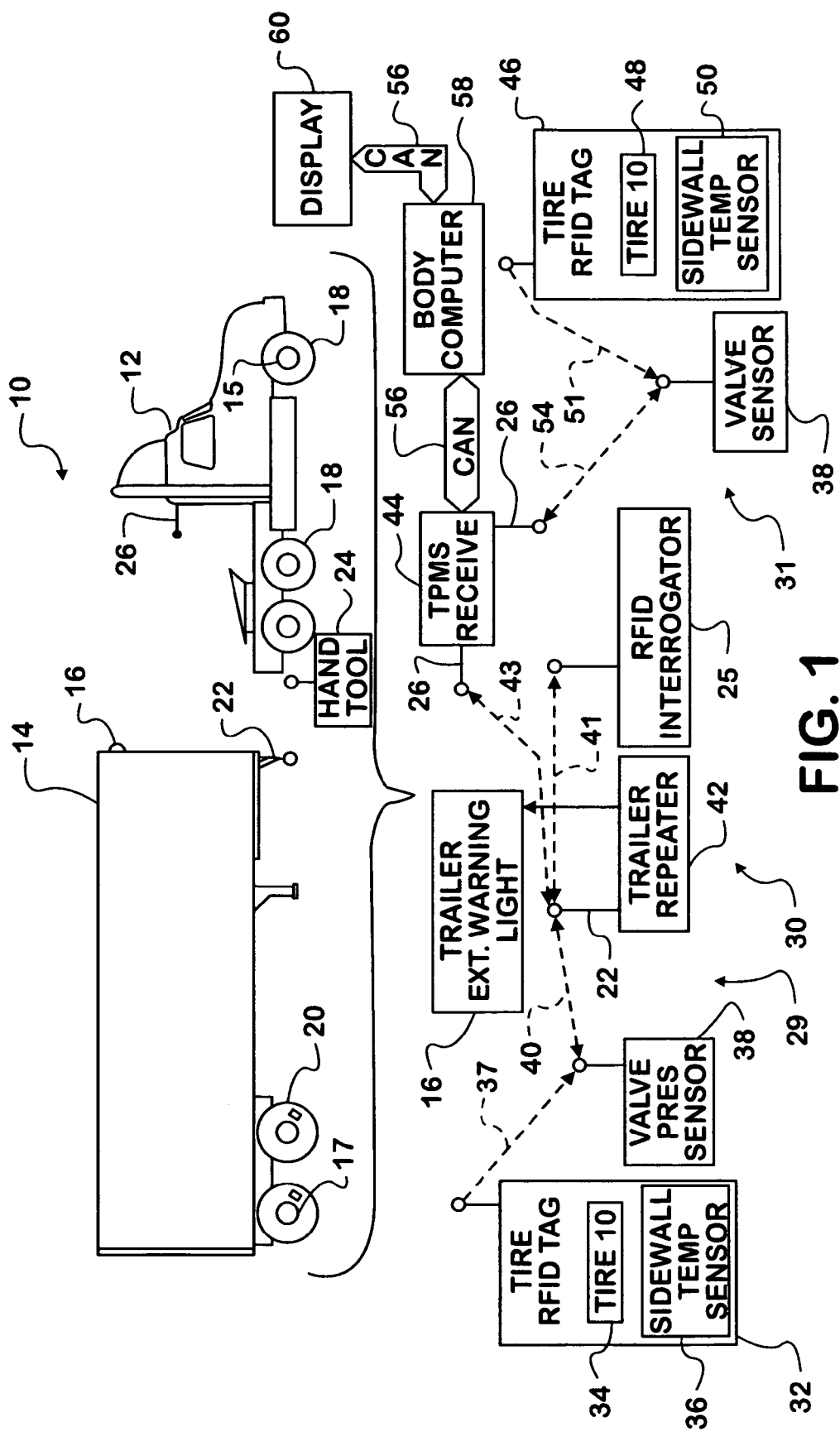
FIG. 1 is a schematic illustration of the major components of the present tire pressure monitoring system.

Referring now to the figures a tractor/trailer combination 10 is illustrated on which a tire pressure monitoring system 30 has been installed. Tractor/trailer combination 10 comprises a tractor 12 and a trailer 14. Tractor 12 is equipped with tires 18 installed on wheels 15. The internal pressure of tires 18 is monitored. Trailer 14 is equipped with tires 20 installed on wheels 17. Tires 20 are similarly monitored for internal pressure. A low pressure warning light is installed on the forward exterior wall of trailer 14 from where it can be seen from the cab of tractor 12. Antennae 22, 26 are strategically located on trailer 14 and tractor 12 for enabling radio frequency data links between the tractor and trailer.

A complete tire pressure monitoring system (TPMS) 30 includes components installed on both the trailer 14 as well as on the tractor 12 and is topologically illustrated in FIG. 1. The TPMS 30 illustrated is a preferred embodiment suited for an OEM installation where tractor 12 is equipped with an SAE J1939 compliant controller area network (CAN) 56. Simplified systems for aftermarket installation on vehicles not equipped with a CAN are certainly possible as will be clear to those skilled in the art. Trailer 14 components are the subset of the TPMS 30 and are capable of limited, stand alone operation. A trailer 14 may be attached to a tractor 12 not including components required to provide a complete system. Thus a trailer warning light 16 is installed on the exterior of the forward wall of trailer 14. Trailer warning light 16 should be installed so as to be readily visible in a rear view mirror from the cab of tractor 12 and the base portion 29 of TPMS 30 should be configured so as to support activation of the warning light 16 even in the absence of additional functionality of tractor based portion 31 when low pressure is detected in any of tires 20. Trailer base portion 29 is also configured to switch automatically from battery to vehicle power if tractor power is available. The trailer warning light 16 may indicate only that a tire is low on pressure, but not indicate which tire.

Even a minimal tractor portion 31 and provision for some RFID functionality can provide for identification of which tire is low. The information is made available in the cab of tractor 12 on a display 60. A receiver having the service functionality of TPMS receiver 44 less (or not using) its CAN interface could serve as such a receiver. Where a vehicle is equipped with a controller area network 56 TPMS receiver 44 is connected to CAN 56 for transfer of data to drive display 60. Where a body computer 58 is available additional management functions, such as lifetime service tracking of tires, and data download services, are made readily available.

The capabilities of the system become more varied as capabilities of individual components are enhanced. For example, tire RFID tags 32, 46 may be either passive or active devices. A passive RFID tag is one which is energized by an impinging interrogation signal while an active RFID tag will have an internal power source, typically a battery. If passive tags are used the interrogation signal, with contemporary technology, must come from quite close by. In the present invention the preferred source for such an interrogation signal is the valve pressure sensor for the associated wheel. Where this it eh case the rotational position of the tire 20 on the wheel 17 may have to be adjusted to bring the RFID tag 32, 46 within range of the interrogator. Alternatively, a hand held tool 24 may be used to transfer tire ID from the RFID tags 32, 46 to the valve pressure sensor 38. If though, the RFID tag 32, 46 is an active device, it can generate a signal strong enough to reach a trailer repeater 42 or the TPMS receiver 44. Either a passive or active RFID tag can be implemented to supply tire sidewall temperature readings though this feature may be more readily implemented in an active device.

A complete TPMS 30 includes a valve pressure sensor 38 for each tire 18, 20 on both tractor 12 and trailer 14. Preferably the valve pressure sensors 38 are installed on the valve stem for each wheel. The considerations involved in such installations are the usual ones of weight, balance, stem vibration, visual appeal, environmental resistance, ease of installation, clearance from the wheel and theft deterrence. Batteries are used for power and they generally will not be replaceable. Thus efforts are taken to maximize battery life to avoid frequent replacement of valve pressure sensors 38. This is achieved using a sleep mode when the vehicle is off. Transmission frequency may be varied depending upon circumstances, for example, it may be reduced when pressure levels are acceptable. Transmission frequency can be increased in response to variance of pressure from desired norms and upon request of the host system. Typically the transmission rate is elevated when the vehicle is moving.

As is well known, tire pressure and temperature are positively correlated. If a pressure drop occurs due to a leak then temperature will also decrease, provided all other factors remaining unchanged. However, if a vehicle is in motion a pressure drop will result in more sidewall flexing of the tire, resulting in the generation of heat and a rise in the temperature inside the tire (with a consequent increase in pressure and, often, the leak rate). Leaks may be difficult to detect quickly if the only variable to be monitored is pressure. Temperature compensation may be required and thus temperature sensors may be incorporated into TPMS 30 for each tire 18, 20. Such sensors will provide cold fill pressure at the start of a vehicle service cycle. Temperature sensors may be incorporated into tire RFID tags 32, 46 and placed in contact with the outside of tire sidewalls to provide operational tire temperature.

Tire RFID tags 32, 46 are installed on the outside sidewalls of the tires 20, 18, respectively. Tire RFID tags 32, 46 always include a unique tire identifier 34, 48 unalterably recorded at a read only memory location on the tags. As described above, RFID tags 32, 46 may come equipped with a sidewall temperature sensor 36, 50. Tire RFID tags 32, 46 are passive devices, energized by valve pressure sensors 38 which are battery powered. RFID tags are well known devices and their design and operation will not be further discussed here. Hand held tool 24 may be used to transfer data from RFID tags 32, 46 to valve pressure sensors 38.

Tire RFID tags 32, 46 respond to interrogation by valve pressure sensors 38 as represented by radio data link 37. Alternatively, for active RFID tags, the data may be communicated directly to repeater 42 or receiver 44. In turn valve pressure sensors 38 provide data to either a trailer repeater 42 or a TPMS receiver 44, depending upon whether the particular valve pressure sensor is installed on trailer 14 or tractor 12. Trailer repeater 42, as described in more detail below, can provide for control of a trailer mounted, external warning light 16. Trailer repeater 42 communicates over a radio frequency link to an RFID interrogator unit 25 over a radio datalink 41 or to a hand tool 24. Repeater 42 also communicates with TPMS receiver 44 if installed on tractor 12.

A full TPMS 30 may require two or more antenna per vehicle. Provided here are a tractor antenna 26 and a trailer antenna 22 for establishing a data link 43 between the vehicle sections. Trailer antenna 22 serves for repeater station 42. Tractor 12 is preferably equipped with a controller area network (CAN) 56 conforming to the SAE J1939 standard for transferring data to computers implementing higher level functions of the TPMS 30. CAN 56 will include a body computer 58 which executes management programs and which passes data on to a cab display 60 through which warnings and indications of tire condition are imaged.

Figure 2:
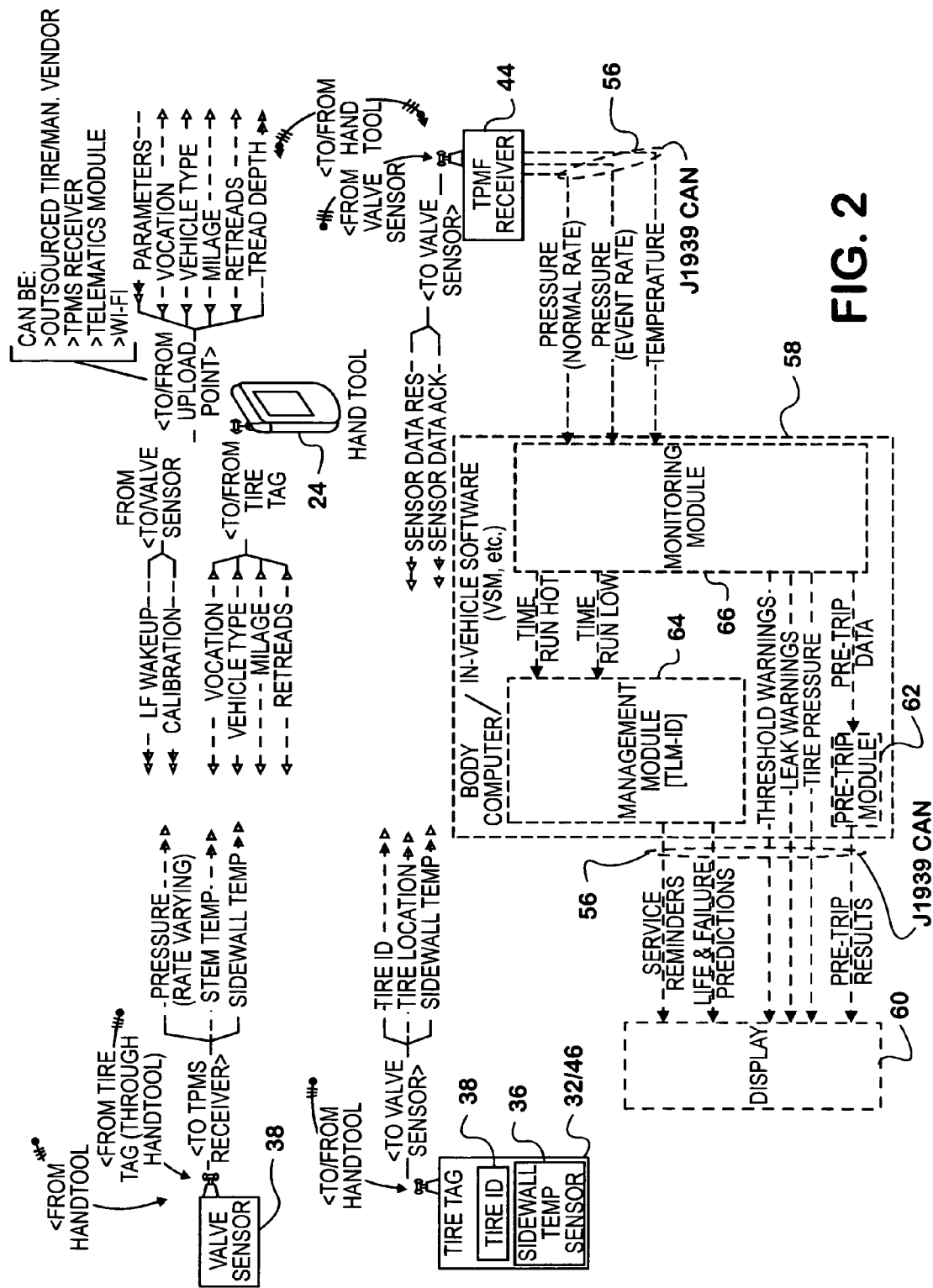
FIG. 2 is a data flow diagram illustrating operation of the invention.

FIG. 2 illustrates data flow in a full TPMS 30. Tire tags 32, 46 automatically provide tire identification (a unique manufacturer's identifying serial number) and sidewall temperature to the valve sensors 38 with which they have bidirectional information. RFID tire tags 32, 46 may be programmed with tire location, which is also passed to the associated valve sensor 38. RFID tags 32, 46 may include additional memory to allow storage of additional information. This information can include tire mileage, average pressure, high and low pressure events, tread depth, retread status, rotation mileages and such other service information as might be needed. This data is updated either by the TPMS management software, or manually by use of a hand tool 24. As indicated in the figure, vocation, vehicle type, mileage and retread status may be bidirectionally passed from an RFID tag 32, 46 to hand tool 24. Hand tool 24 is also programmable from an upload port with various parameters including vocation, vehicle type, mileage, retread status and tread depth. The data typically can come from TPMS receiver 44 or the body computer 58, or by hand entry.

Valve sensors 38 pass on information supplied locally by the associated tire RFID tag 32, 46. Valve sensors 38 pass the information to the TPMS receiver 44 (either directly or by repeater 42) and add pressure measurements and stem temperature (if available). Valve sensors 38 receive wake up calls and calibration signals from TPMS receiver 44 (again either directly or by repeater 42).

TPMS receiver 44 provides an access point to the motor vehicle CAN 56. TPMS receiver 44 is the broadcast source of sensor data requests and acknowledgment signals and is connected to the CAN 56. All relevant data required by body computer 58 for tire pressure management is provided as data packets over CAN 56. Body computer 58 in turn determines what information to display on display 60, which is also transmitted over CAN 56. Body computer 58 provides for execution of up to three software modules used to implement the TPMS 30. The modules include a monitoring module 66 which handles reported data received over CAN 56 from TPMS receiver 44. Monitoring module 66 determines occasions of departures from operating norms and issues threshold warnings, leak warnings and tire pressure readings to display 60 over CAN 56. Determination of which warnings to display occurs after appropriate normalization of the data, adjustment of pressure readings for temperature changes and comparison to predetermined limits. Tire pressure can simply be reported or corrected. A management module 64 may be provided. This module tracks long term data such as mileage on tires and can track operating history to provide service reminders and forecast failures. A pre-trip module 62 retains pressure readings taken upon start up of the vehicle. It is not strictly necessary that leak detection be determined by the body computer 58 and it may, in some instances, be done at the trailer repeater 42 or the TPMS receiver 44.

Figure 3:
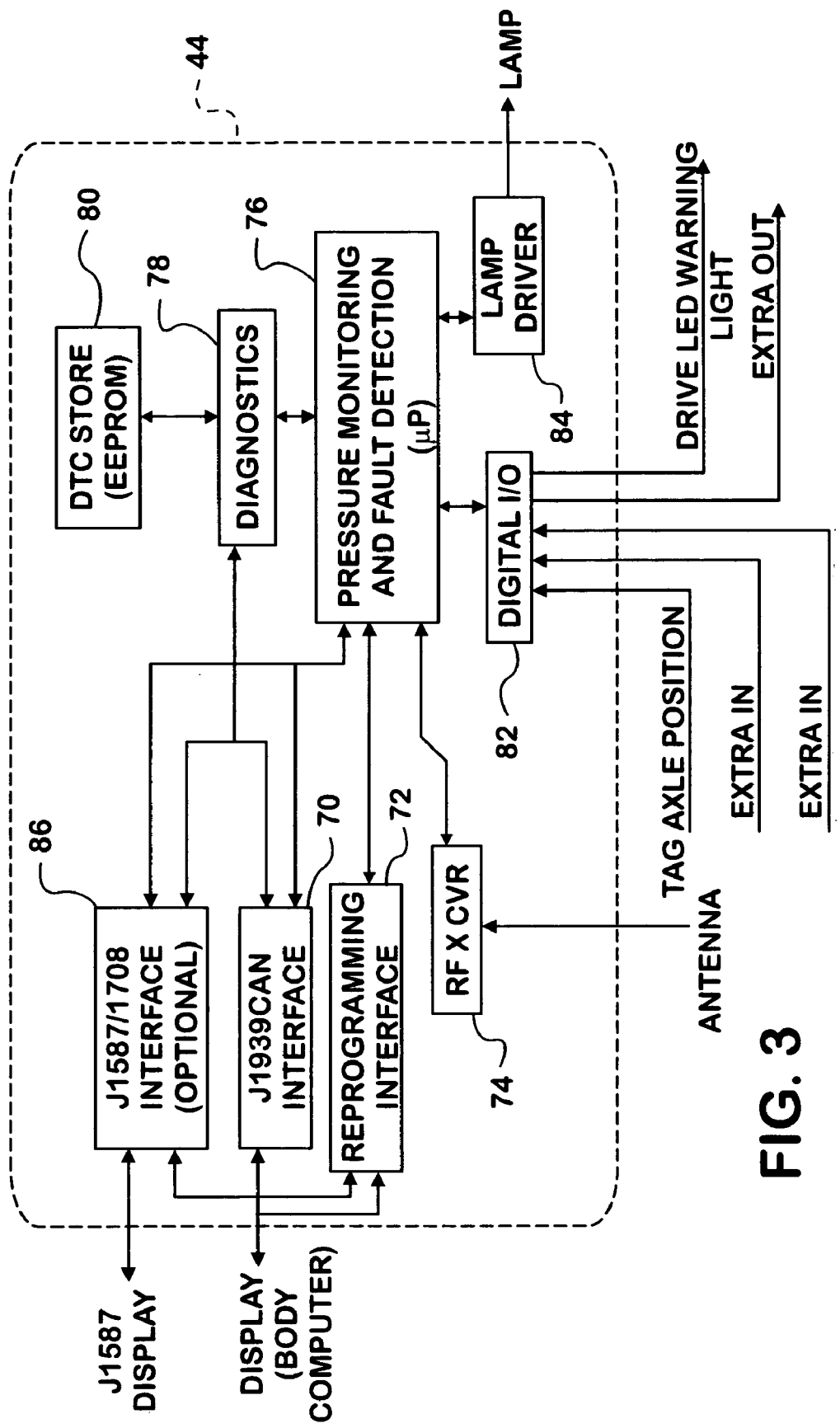
FIG. 3 is a block diagram of a tire pressure monitoring system receiver.

Referring to FIG. 3 a block diagram schematic of a TPMS receiver 44 is illustrated. TPMS receiver 44 includes pressure monitoring and fault detection functionality through a programmed microprocessor 76 for use in case of installation on a vehicle not having a CAN. TPMS receiver 44 typically receives wireless reports of data from valve pressure sensors 38, 46 over an antenna connected to a radio frequency transceiver 74, and reports the data to microprocessor 76. Microprocessor 76 can receive data over other channels as well including CAN 56 through J1939 interface 70 and, optionally, J1587/J1708 interface 86. A reprogramming interface may be connected to CAN 56. All interfaces are connected to supply data directly to microprocessor 76. The network interfaces 70, 86 are further connected to exchange data with diagnostics block 78. Memory 80 is available to microprocessor 76 and diagnostics block 78. Microprocessor 76 also receives inputs over a digital input/output port 82. Inputs potentially relate to axle positions specifically identified with tires. Outputs including a drive LED warning light output can be generated over digital I/O 82.

Figure 4:
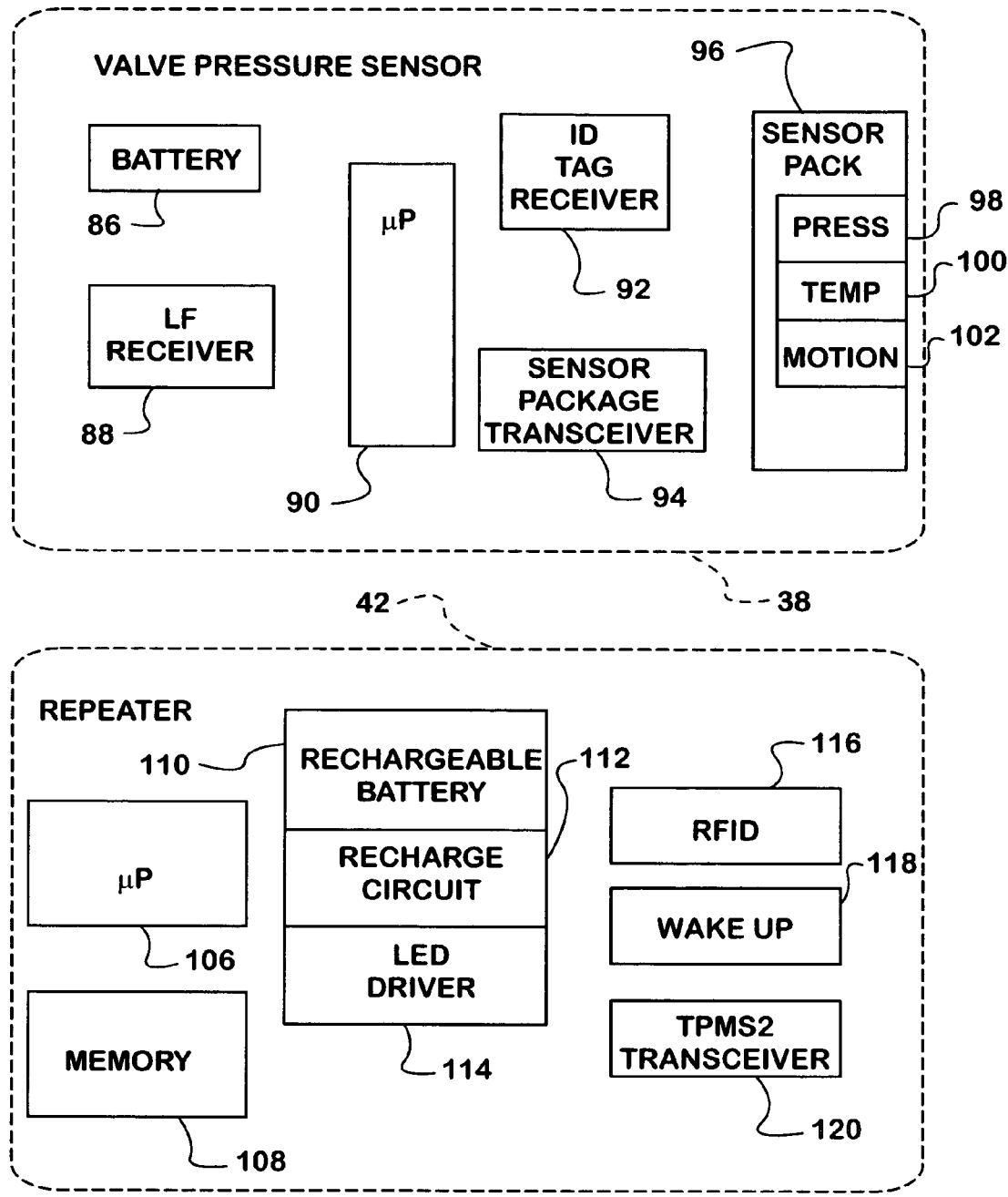
FIG. 4 includes block diagrams for a valve mounted sensor and a system repeater.

Referring to FIG. 4, functional block diagrams for valve pressure sensors 38 and trailer repeater 42 are provided. Valve pressure sensor 38 includes a battery 86, a low frequency transceiver 88 for communication with TPMS receiver 44 or trailer repeater 42, a microprocessor 90, an RFID reader 92, a sensor package transceiver 94 and a sensor package 96 including a stem pressure sensor 98, a temperature sensor 100 providing ambient temperature at start up and a motion sensor 102. Start up ambient temperature readings provide some level of correlation with sidewall temperature taken later during driving and may be used for temperature compensation. Trailer repeater 42 includes a local processor 106 and memory 108 and, in case no tractor TPMS is available, can function as a stand alone system performing the required comparisons to determine if a low pressure condition exists in any tire. Trailer repeater 42 further includes a rechargeable battery 110, recharge circuit 112 and an LED driver 114. In order to save power repeater 42 has a power down or sleep mode and a wake up circuit 118 is provided. An RFID interrogator 116 is provided as well as a TPMS transceiver 120 for the exchange of data with transceiver 44.

Valve sensors 38 transmit data to a TPMS receiver 44 either directly or by trailer repeater 42. Microcontroller 90 is programmed with a pressure threshold. In response to detection of pressure falling below the threshold the pressure reading transmission rate increases. Normally the pressure transmission rate is quite slow to prolong battery life. A motion sensor 102 enables sensor transmission rate increases if the vehicle is moving. This allows TPMS 30 to determine fast leakage rates and other warning conditions. The programmable threshold can be reprogrammed by TPMS 30 if the system determines that operational parameters for the truck have changed. The parameters can include average climate, average load and other factors. Default parameters are selected to be universally applicable, but are preferably optimized for specific vehicles in order to improve fuel economy and prolong battery life. LF receiver 88 allows sensor 38 to be awakened and communicated with by a hand tool 24 or by repeater 42.

Repeater 42 is used as a bridge from tire pressure sensors 38 to TPMS receiver 44 which is mounted on tractor 12. RF retransmission is provided. In order to extend battery service life, repeater 42 is not always in a listening mode. An embedded RFID transceiver 116 detects when a tractor 12 has backed to the trailer 14 and a handshake signal is transmitted to TPMS receiver 44. The handshake provides the unique tire ID numbers for tires installed on the trailer 14, along with axle locations and may be used to activate repeater 42.

Wheel valve sensors 38 transmit at a slow rate when the vehicle is not moving. Repeater 42 includes a rechargeable battery 86, which provides power allowing the repeater to receive these signals and to store the most recent data. If a leak is detected an LED, which is mounted on trailer 14 where easily seen, is set to flashing. This serves to alert yard mechanics to attend to the tires when a tractor is not present. If a tire pressure problem exists when the tractor comes into position to connect to the trailer 14, repeater 42 alerts the TPMS 30 upon activation. When a tractor 12 connects to a trailer 14 the repeater's battery 86 goes into recharge mode and the repeater begins to use the tractor's power supply.

Tractor 12 is also equipped with an RFID interrogator, which maybe UHF or LF based depending upon the required transmission range. RFID interrogator 25 is located in an area where it will activate a trailer mounted RFID tag 116 when the tractor comes within five feet of the trailer which can in turn supply a wake up signal to repeater 42. Interrogator 25 may be triggered by the driver, automatically or when a particular state is true, for example, if the tractor is in reverse. Tractor RFID interrogator 25 listens for a response identifying the trailer 14 and for trailer conditions requiring attention.

While the invention is shown in only one of its forms, it is not thus limited but is susceptible to various changes and modifications without departing from the spirit and scope of the invention.

What is claimed is:

1. A pressure monitoring system for a plurality of tires installed on wheels of a motor vehicle, the motor vehicle being potentially assembled from component sections including tractor and trailers, the pressure management system comprising:
   a radio frequency identification tag installed on each of the plurality of tires and identifying particular tires with a code, specific to that tire;
   a plurality of pressure sensors with radio transmitters mounted in communication with valve stems on the wheels, the radio transmitters providing for relay of the codes for the tires mounted on the wheels and for transmission of pressure measurements;
   a radio repeater installed on a trailer having a communication link with at least a first of the pressure sensors with radio transmitters;
   a tire pressure management system receiver installed on the tractor having a controller area network interface and further capable of establishing a radio link with the pressure sensors directly or through the radio repeater;
   a controller area network coupled to the tire pressure management receiver;
   a body computer connected to the controller area network for exchanging data with the tire pressure management system receiver and for execution of software modules implementing the tire pressure management system;
   the radio repeater having local data processing facilities allowing determination of variance in pressure readings reported by said at least first of the pressure sensors from preestablished norms;
   means under the control of the radio repeater for displaying indication of a tire pressure variance from the preestablished norms;
   the radio frequency identification tags installed on the tires further including a sidewall temperature sensor;
   the pressure sensors including means for interrogating the radio frequency identification tags for the unique code and the temperature readings;
   means for retransmitting the unique code and the temperature readings with pressure readings generated by the pressure sensor; and
   means for responsive to the sidewall temperature readings and pressure readings for generating temperature compensated pressure estimates.

2. A pressure monitoring system for tires in accordance with claim 1, further comprising:
   a radio frequency identification tag installed on the trailer; and
   a radio frequency identification interrogator installed on the tractor for activating the radio frequency identification tag installed on the trailer to generate a wake up signal for the repeater responsive to positioning of the tractor within a predetermined maximum distance from the trailer.

3. A pressure monitoring system for tires in accordance with claim 1, further comprising:
   temperature sensors incorporated in the pressure sensors for determining outside ambient temperature at start up; and
   means responsive to the outside ambient temperature for adjusting later side wall temperature readings.

4. A pressure monitoring system for tires in accordance with claim 3, further comprising:
   software modules stored on the body computer for execution for determining variance of the pressure in the tires from norms and for determining leakage from the tires responsive to the compensated pressure estimates.

5. A pressure management system for tires installed on vehicle wheels, the pressure management system comprising:
   pressure sensors mounted with respect to the vehicle wheels for taking pressure readings for the tires installed thereon, the pressure sensors including wireless communication facilities for transmitting tire pressure readings and identification of the tire to which each pressure reading relates;
   a repeater including wireless communication facilities for establishing two way communication with at least a first of the pressure sensors for receiving the pressure readings taken by said at least first of the pressure sensors and further including local data processing capability for comparing the pressure readings against predetermined norms and generating an energization signal in response to the pressure readings falling outside of limits fixed by the predetermined norms;
   a fault marker activated in response to the energization signal;
   a tire pressure management receiver in 2-way communication with the repeater for a plurality of radio frequency identification tags installed on the tires, the radio frequency identification tags providing unique identifiers for each tire and side wail temperature readings for each tire and allowing for storage of tire operational history;
   means for applying messages correlating tire pressure readings, unique identifiers and tire side wall pressures to the tire pressure management system; and
   data storage means correlating unique identifiers with wheel locations.

6. A pressure management system in accord with claim 5, further comprising:
   the means for applying including the repeater.

7. A pressure management system in accord with claim 6, further comprising:
   computing means responsive to the pressure readings, the temperature readings and the unique identifiers and having access to the data storage means for obtaining correlations between unique identifiers and wheel locations and for generating temperature compensated pressure estimates identified by wheel location for display; and
   a display.

8. A pressure management system in accord with claim 7, further comprising:
   a trailer on which the pressure sensors, the repeater and the fault marker are carried.

9. A pressure management system in accord with claim 5, further comprising:

a receiver including wireless communication facilities for establishing two way communication with the repeater;

a display connected to the receiver for displaying telemetry relating to pressure readings passed from the repeater to the receiver.

10. A pressure management system in accord with claim 8, further comprising:

a tractor on which the receiver and display are installed.

11. A pressure management system in accord with claim 10, further comprising:

a controller area network on the tractor with the receiver and display connected to the controller area network; and the computing means including the body computer connected to the controller area network for operating on the telemetry and controlling the display.

12. A pressure management system in accord with claim 11, further comprising:

a second set of pressure sensors installed on vehicle wheels attached to the tractor, the pressure sensors of the second set providing for taking pressure readings of tires installed on the tractor and including wireless communication facilities for establishing two way communication with the receiver and transmitting pressure readings to the receiver.

13. A pressure management system in accord with claim 12, further comprising:

radio frequency identification tags installed in the tires including a unique identifier for each tire; and radio frequency identification interrogators installed in the pressure sensors whereby the pressure sensors report the unique identifiers with the pressure readings.

14. A pressure management system in accord with claim 13, further comprising:

temperature sensors installed on the radio frequency identification tags in the tires readings from which are transmitted to the pressure sensors over the communication facilities.

15. A pressure management system in accord with claim 14, further comprising:

a radio frequency interrogator installed on the tractor; and a radio frequency identification tag installed in the repeater identifying a particular trailer and adapted to provide a wake up signal to the repeater in the proximity to the radio frequency interrogator installed on the tractor.

* * * * *